(12) United States Patent
Botzelmann

(10) Patent No.: US 7,469,759 B2
(45) Date of Patent: Dec. 30, 2008

(54) LAYOUT OF AN ELECTRICAL POWER SYSTEM PROVIDED WITH A FUEL CELL IN AN ELECTRIC VEHICLE

(75) Inventor: Herbert Botzelmann, Remshalden (DE)

(73) Assignee: Daimler AG, Stuttgart (DE)

( * ) Notice: Subject to any disclaimer, the term of this patent is extended or adjusted under 35 U.S.C. 154(b) by 411 days.

(21) Appl. No.: 10/532,347

(22) PCT Filed: Sep. 20, 2003

(86) PCT No.: PCT/EP03/10513

§ 371 (c)(1),
(2), (4) Date: Dec. 8, 2005

(87) PCT Pub. No.: WO2004/037592

PCT Pub. Date: May 6, 2004

(65) Prior Publication Data

US 2006/0127715 A1    Jun. 15, 2006

(30) Foreign Application Priority Data

Oct. 24, 2002    (DE) ................................ 102 49 437

(51) Int. Cl.
*B60K 3/00* (2006.01)
(52) U.S. Cl. .................... 180/65.2; 180/65.4; 180/65.1; 180/205; 180/68.5; 180/65.3; 180/69.4
(58) Field of Classification Search ................ 180/65.4, 180/65.1, 205, 68.5, 65.3, 69.4, 65.2
See application file for complete search history.

(56) References Cited

U.S. PATENT DOCUMENTS 4,365,681 A * 12/1982 Singh ..................... 180/68.5

| 5,193,634 | A | 3/1993 | Masut |
| 5,390,754 | A | 2/1995 | Masuyama et al. |
| 6,378,637 | B1* | 4/2002 | Ono et al. ................... 180/65.3 |
| 6,648,085 | B2* | 11/2003 | Nagura et al. .............. 180/65.1 |
| 6,777,909 | B1* | 8/2004 | Aberle et al. ............... 320/104 |
| 7,057,306 | B2* | 6/2006 | Belschner et al. ............ 307/9.1 |

FOREIGN PATENT DOCUMENTS

| DE | 44 12 450 A1 | 4/1994 |
| DE | 44 27 322 A1 | 8/1994 |
| DE | 197 38 620 C1 | 9/1997 |
| DE | 199 62 685 A1 | 12/1999 |
| DE | 100 10 398 A1 | 2/2000 |

(Continued)

*Primary Examiner*—Christopher Ellis
*Assistant Examiner*—Cynthia F. Collado
(74) *Attorney, Agent, or Firm*—Crowell & Moring LLP

(57) ABSTRACT

The subject matter of the invention is an arrangement of an electrical power generating system in an electrical vehicle. The electrical power generating system has a first module (2) for preprocessing and metering of the gases to be supplied to a fuel cell, a second module (4) with the fuel cell, and an electrical power distribution module (15). The first module (2) and the second module (4) are mounted in a container (9). The unit comprising the container with the two modules is installed in the electrical vehicle from underneath, in a cavity provided for this purpose. The electrical power distribution module (15) is then attached to the outside of the container.

10 Claims, 1 Drawing Sheet

FOREIGN PATENT DOCUMENTS

| | | |
|---|---|---|
| DE | 100 26 268 A1 | 5/2000 |
| DE | 100 53 849 A1 | 10/2000 |
| EP | 0 559 176 B1 | 5/1996 |
| FR | 2 816 889 | 11/2001 |
| WO | WO 01/60655 A1 | 8/2001 |
| WO | WO 02/067346 A2 | 8/2002 |

* cited by examiner

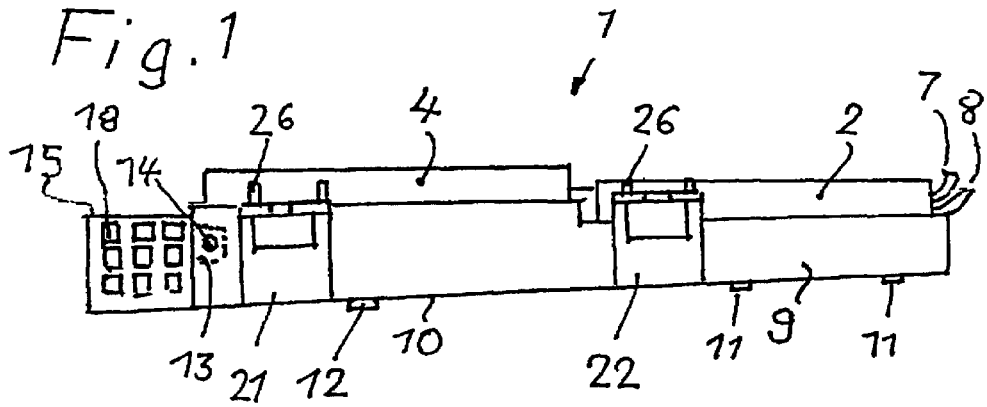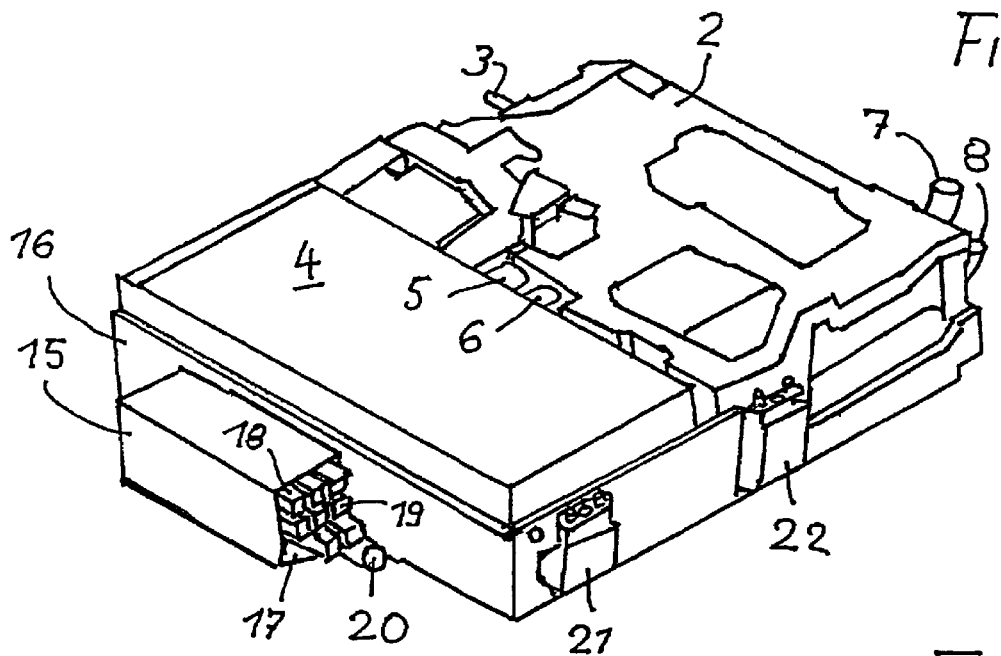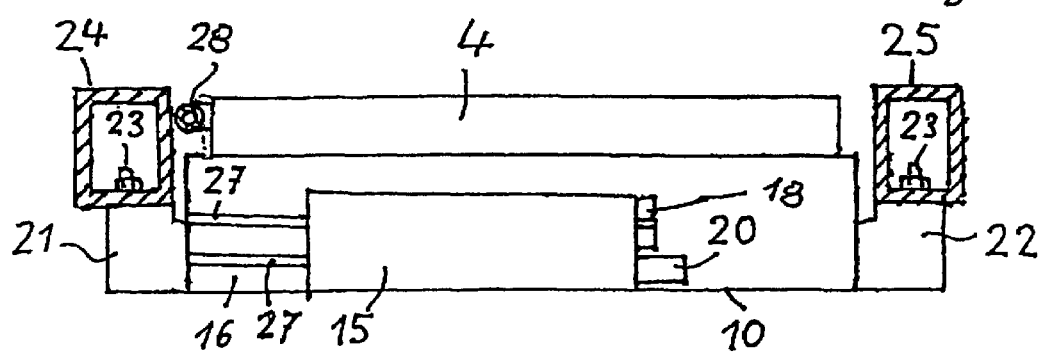

LAYOUT OF AN ELECTRICAL POWER SYSTEM PROVIDED WITH A FUEL CELL IN AN ELECTRIC VEHICLE

BACKGROUND AND SUMMARY OF THE INVENTION

This application claims the priority of German patent document 102 49 437.1, filed Oct. 24, 2002 (PCT International Application No. PCT/EP2003/010513, filed Sep. 20, 2003), the disclosure of which is expressly incorporated by reference herein.

The invention relates to an electrical power generating system that includes at least one electrical traction motor, a fuel cell, and means for supplying the fuel cell with a combustion gas and an oxidizing gas, in an electric vehicle that has a load-bearing structure with longitudinal supports.

German patent document DE 4 412 450 A1 discloses a vehicle with such an electrical power generating system. The vehicle has a chassis that includes two longitudinal supports and two transverse supports, with front and rear axles articulated on the longitudinal supports. The electrical traction motor is arranged on the front axle, and is connected to an electrical power controller which is fed from the fuel cell that includes a stack of individual fuel cells. A reformer, a fuel tank and additional units such as ion interchangers, condensation separators, reformat coolers, heat exchangers, temporary hydrogen stores and fuel cell coolers are provided in order to produce the combustion gas. The oxidizing gas is fed into the fuel cell using a compressor which is preceded by an air filter.

One object of the present invention is to provide an electrical power generating and distribution system for an electric vehicle, which contains prefabricated parts with which the vehicle can quickly be equipped.

Another object of the invention is to provide a method for simple installation of such an electric power generating system in an electric vehicle.

These and other objects and advantages are achieved by the electric power generating system according to the invention, which contains a first module with appliances at least for preprocessing and metering of the gases to be fed into the fuel cell and a second module with the fuel cell itself. The fuel cell is connected to the first module by mechanical coupling means, for carrying the gases to be supplied to the fuel cell, dissipating reaction gases from the fuel cell, and carrying at least one coolant via the fuel cell, and by electrical coupling elements, which transmit measured values from sensors.

The first module and the second module are jointly mounted in a container which can be inserted into a cavity in the vehicle (accessible from the underneath side), and can be attached to the longitudinal supports in the vehicle by at least four holders fitted to the container longitudinal side walls. An electrical power distribution module, which includes at least distribution circuits with fuses, and a switching element for switching the distribution circuits on and off, can be attached to a side wall of the container and can be connected via coupling elements to the electrical outputs of the fuel cell and to cables to the electrical loads in the electrical vehicle.

The electrical power generating system according to the invention thus has three modules which can be produced autonomously. Two of the modules are mounted within the container and the third is connected to an outer wall of the container. The first and second modules can be produced in a workshop configured particularly for this purpose. The connections between the two modules can also be made there using a jig, based on their arrangement. The unit comprising the two modules connected to one another is then installed in the container. The assembly formed in this way is suitable as a supply part.

The first module together with the appliances for preprocessing and metering of the gases to be fed into the fuel cell is preferably arranged at the front of the container, relative to the direction of travel of the electrical vehicle, and is screwed to the bottom of the container. This arrangement allows the module, which is also referred to in the following text as the gas preprocessing module, to be attached quickly and easily.

In a further preferred embodiment, the second module (the "fuel cell module") has a housing which contains the numerous individual fuel cells with electrical connections. It is connected to the container by two screws at the rear container bottom and via one holder on each of the left and right sides, alongside the front face. Particularly when designed for high electrical power levels, the fuel cell is relatively heavy and is attached to the container at four points.

The third (electrical power distribution) module can be attached to an outer wall of the container, which is adjacent to the second module and runs transversely with respect to the longitudinal supports. The electrical power distribution module is lighter than the fuel cell module and the gas preprocessing module; it can therefore be handled more easily and can also be attached to the container more easily after the latter has been installed in the electric vehicle.

It is also expedient to provide at least two holders with guide pins on each of the two longitudinal faces of the container. The guide pins can then be pushed into holes in the longitudinal supports in the electrical vehicle, and the holders can be attached to the longitudinal supports by means of screws, so that the two modules to be attached to the vehicle quickly and easily.

The holders preferably include movement restriction means, which restrict the movement of the container relative to the longitudinal supports, and allow such movement only in the event of an impact beyond a specific impact strength. They may also have energy absorption means for controlled transmission of kinetic energy from the container to the longitudinal supports, with energy being at least partially destroyed.

In the method according to the invention for mounting or installing an electrical power generating system such as described above, in an electrical vehicle which has a load-bearing structure with longitudinal supports, a first module with appliances for preprocessing and metering of fuel gases and a second module with the fuel cell are produced. These first and second modules are arranged in an apparatus and are then connected to one another by mechanical coupling elements, including lines for the substances to be supplied to and from the fuel cell and coolant routing for the fuel cell, and electrical coupling elements for sensor signal transmission between the two modules. The connected modules are then mounted in a common container, which is then inserted (together with the modules) into the electric vehicle from underneath, into a cavity provided for that purpose, and attached to the longitudinal supports.

The third module, which contains an electrical connection for the electrical outputs of the fuel cell, electric power distribution circuits with fuses for connection of electrical loads, and at least one switching element for switching the electrical power distribution circuits on and off, is then attached to the container externally on a side wall. The electrical connections are then made from the third module to the fuel cell and to electrical loads in the vehicle. The first module is connected to a source of combustion gas and a channel for air supply, and is connected by means of inputs and outputs to at least one cooling circuit in the electrical vehicle and to output line for the reaction products from the fuel cell.

The method according to the invention makes it possible to produce major components of the electrical power supply system in their own right, remote from the vehicle assembly location, and to join them together to form a self-supporting unit which can be transported to the vehicle assembly location, and installed in this vehicle quickly and easily. Overall, this reduces the amount of effort for assembly of the vehicle.

The gas preprocessing module is mounted in the front of the container, relative to the direction of travel, by two screws. The fuel cell module is expediently mounted by means of two screws in the rear part of the container bottom, and by means of two holders, which are each arranged on one face of the module on the longitudinal side walls of the container. A mechanical interface between the gas preprocessing module and the fuel cell module includes inputs for hydrogen gas and air, inputs and outputs for at least one cooling medium, and outputs for the reaction products. An electrical interface is provided for the measured values from pressure and temperature sensors. The coupling elements of the interfaces are produced in a jig after the arrangement and connection of the gas preprocessing module and of the fuel cell module. The modules which have been connected to one another are then mounted in the container.

The container together with the two modules is then installed in the electrical vehicle by being pushed on a lifting device into a cavity in the vehicle. It is then screwed to the longitudinal supports at four holders, which are fitted to the longitudinal faces of the container. The electrical power distribution module, which contains connections for the electrical outputs of the fuel cell and outgoing lines with fuses for the connection of electrical loads in the vehicle, and an on/off switch for the outgoing lines, is then attached to a wall of the container which runs transversely with respect to the longitudinal supports. The electrical connections are then made. Finally, connections are also made from a hydrogen source to an input on the gas preprocessing module, from an air induction channel to the gas preprocessing module, and from there to output lines for the reaction products of the fuel cell, to vent lines and to a coolant source.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of an electric vehicle power generating system according to the invention, which is composed of modules and is arranged in a container;

FIG. 2 shows a perspective view from above the electrical power generating system of FIG. 1; and FIG. 3 is a schematic front sectional view, taken through longitudinal supports in an electrical vehicle having a container, which is attached to the longitudinal supports, with modules of an electrical power generating system.

DETAILED DESCRIPTION OF THE DRAWINGS

As shown in FIGS. 1-3, an electrical power generating system 1 for an electrical vehicle has a first module 2 with appliances for preprocessing and metering of the gases to be fed into a fuel cell. The gases are, for example, hydrogen as the combustion gas and air as the oxidizing gas. The module 2 has an input 3 for hydrogen which is supplied via a metering valve to the fuel cell, which is arranged in a second module 4. (Conventional components, such as a compressor for the air, an air filter, sensors for the pressure, temperature and gas flow rates, and further components for the metering of hydrogen are provided in the module 2, but are not shown, for the sake of simplicity.)

The module 4 contains the fuel cell (which is in the form of a stack of individual fuel cell elements) with connections for the supply of hydrogen, air, coolant, and outputs for the reaction products as well as electrical connections for the emission of currents and measured values from sensors in the fuel cell. Interfaces for coupling elements are provided between the two modules 2, 4, for the transmission of the coolant, for example water, hydrogen gas, air and the reaction products of the fuel cell. (Two such coupling elements 5, 6 are illustrated in FIG. 2.) Further electrical interfaces (also not illustrated), are likewise provided for the transmission of measured values from sensors arranged in the fuel cell, with the corresponding coupling elements. In addition to the fuel input 3, the module 2 has inputs and outputs for the coolant, an input for air and at least one output for reaction products of the fuel cell. (Two such inputs and outputs 7, 8 are illustrated in FIG. 2.)

The two modules 2, 4 are jointly arranged in a container 9, in the form of a trough whose bottom forms a part of the lower face of the electric vehicle. The module 2, together with the appliances for the preprocessing and metering of the gases, is mounted by means of screws 11 on the bottom 10 of the container 9 at the front, relative to the longitudinal direction of the vehicle. The module 4, which has a housing that contains the individual fuel cell elements (not illustrated) is screwed to the bottom 10 of the rear part of the container 9 by means of two screws 12. Furthermore, the module 4 is attached by means of screws 14 to the side walls of the container 9 via two holders 13 which are located at the side on the left and right of the front surface of the container 9.

The third module 15 (also referred to as electrical power distribution module), contains connections for the electrical outputs of the fuel cell and outgoing with fuses for the electrical loads on the high-voltage network that is fed from the fuel cell (for example, 200 V-400 V in the electrical vehicle), and at least one on/off switch for the outgoing. Relative to the forward direction of travel of the vehicle, the module 15 is attached on the outside of the rear wall 16 of the container 9. This wall 16 is adjacent to the module 4. Two or more plug connector elements, (for example, elements 18, 19 and 20) which are located on a wall 17 of the module 15, are provided for the connecting cables which lead to the loads on the high-voltage network.

Holders 21, 22 are attached respectively to the two longitudinal faces of the container 9 (that is, the faces which run transversely with respect to the longitudinal supports in the vehicle), and for attaching the electrical power generating system 1 to the vehicle. The holders 21, 22 are attached by means of screws 23 to two longitudinal supports 24, 25 of a load-bearing structure of the electrical vehicle. The holders 21, 22 have guide pins 26 which project into corresponding holes (not illustrated in any more detail) in the longitudinal supports 24, 25 and are provided for rapid alignment of the container 9 with respect to the location of that attachment to the longitudinal supports during assembly.

The holders 21, 22 are equipped with movement restriction means, which restrict the movement of the container 9 relative to the longitudinal supports 24, 25, allowing such movement only in the event of an impact of the vehicle beyond a specific impact strength. Furthermore, the holders 21, 22 have energy absorption means for controlled transmission of kinetic energy from the container 9 to the longitudinal supports 24, 25, with at least partial energy dissipation. The holders 21, 22 have a type of framework, which allows oscillating movements of the type described above. German patent document DE 197 38 620 C1 describes a conventional holder for a battery mount in an electrical vehicle, which allows the movements described above and the energy dissipation in the event of a crash.

The modules 2 and 4 may each be produced separately, with the components that are not illustrated in detail being inserted into the modules and mounted therein. The necessary connections between the components are then made in the modules 2 and 4. The two modules 2, 4 are then fixed and connected to one another in an apparatus, for example a jig. Once the coupling elements have been fitted between the two modules 2, 4, the latter are inserted into the container 9. The module 2 is screwed to the bottom 10 of the container 9, at the front. At the rear, the module 4 is screwed to the bottom 20 of the container, and to the side walls of the container 9.

The container together with the modules 2, 4 is a robust unit which can be transported on its own and which can be manufactured in particular as a supply part for an electrical vehicle. A heavier fuel cell is required in order to achieve more power. The container together with the modules 2, 4 is placed on a lifting device and is raised from underneath into a cavity (which is provided for this purpose) in the jacked-up electrical vehicle, until the guide pins 26 engage in the holes (not shown) which are provided for this purpose in the longitudinal supports 24, 25, and the holders 21, 22 rest on the longitudinal supports 24, 25. The holders 21, 22 are then screwed to the longitudinal supports 24, 25.

The module 15 is then pushed from underneath in guide rails 27 on the wall 16 as far as a stop (not illustrated), and is attached to the wall 16 by means of screws. The contacts (which are not illustrated) on the fuel cell and on the module 15 are then connected to one another. Once the module 15 has been fitted to the wall 16 of the container 9 that is mounted in the electrical vehicle, and once the electrical connections between the fuel cell and the module 25 have been made, the connecting line 28 for the hydrogen supply to the input 3, the lines to the inputs and outputs for air, the reaction products and cooling water are laid. A high-temperature and a low-temperature cooling circuit can be arranged in the vehicle, both of which are passed to the modules 2, 4 via the container. The means for provision of the hydrogen, for example a hydrogen tank, will have already been fitted in the electrical vehicle before the installation of the electrical power supply system 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electrical power generating system for an electric vehicle which has at least one electric traction motor, and a load-bearing structure with longitudinal supports, said electrical power generating system comprising:
   a first module that includes devices for preprocessing and metering of gases to be supplied to a fuel cell;
   a second module that includes the fuel cell; and
   an electric power distribution module, which includes distribution circuits with fuses and at least one switching element for switching the distribution circuits on and off;
   wherein the fuel cell is connected to the first module by mechanical coupling means for carrying the gases to be supplied to the fuel cell, dissipating the reaction gases from the fuel cell, and carrying at least one coolant via the fuel cell, and by electrical coupling elements for transmitting measured values from sensors;
   wherein the first module and the second module are jointly mounted in a container that is of such a size and shape as to be insertable into a corresponding cavity on an underneath side of the vehicle, and has at least four holders which are fitted to the container side walls, for attaching to the longitudinal supports in the vehicle; and
   wherein the electric power distribution module can be attached to a side wall of the container and can be connected via connector elements on at least one wall of the electric power distribution module to the electrical outputs of the fuel cell and to cables to the electrical loads in the electrical vehicle.

2. The arrangement as claimed in claim 1, wherein, in an installed position, the first module, including the devices for preprocessing and metering gases to be fed into the fuel cell, is arranged at a front area of the container, relative to a direction of travel of the electric vehicle, and is screwed to the bottom of the container.

3. The system of claim 2, wherein the second module has a housing that contains individual fuel cells with electrical connections, and is connected to the container by two screws at a bottom area of the container, via one holder on a left side wall of the container and via one holder on a right side wall of the container.

4. An electrical power generating system for an electric vehicle which has at least one electric traction motor, and a load-bearing structure with longitudinal supports, said electrical power generating system comprising:
   a first module that includes devices for preprocessing and metering of gases to be supplied to a fuel cell;
   a second module that includes the fuel cell; and
   an electric power distribution module, which includes distribution circuits with fuses and at least one switching element for switching the distribution circuits on and off;
   wherein the fuel cell is connected to the first module by mechanical coupling means for carrying the gases to be supplied to the fuel cell, dissipating the reaction gases from the fuel cell, and carrying at least one coolant via the fuel cell, and by electrical coupling elements for transmitting measured values from sensors;
   wherein the first module and the second module are jointly mounted in a container that is of such a size and shape as to be insertable into a corresponding cavity on an underneath side of the vehicle, and has at least four holders which are fitted to the container side walls, for attaching to the longitudinal supports in the vehicle;
   wherein the electric power distribution module can be attached to a side wall of the container and can be connected via coupling elements to the electrical outputs of the fuel cell and to cables to the electrical loads in the electrical vehicle; and
   wherein the electrical power distribution module is attachable to said side wall on the outside of the container adjacent to the second module, and said side wall runs transversely with respect to the longitudinal supports.

5. The system of claim 4, wherein at least two holders are provided on each of two longitudinal faces of the container and have guide pins which can be pushed into corresponding holes in the longitudinal supports of said load-bearing structure, and the holders can be attached to the longitudinal supports by screws.

6. The system of claim 5, wherein the holders have movement restriction means, which restrict the movement of the container relative to the longitudinal supports, and allow such movement only in the event of an impact beyond a specific impact strength, and the holders have energy absorption means for controlled transmission of kinetic energy from the container to the longitudinal supports, with energy being at least partially dissipated.

7. A method for installing an electric power generating system in an electric vehicle which has at least one electric traction motor, and a load-bearing structure with longitudinal supports, said method comprising:

producing a first module that includes devices for preprocessing and metering of gases to be supplied to a fuel cell, a second module that includes the fuel cell, and a third module, which has connector elements on at least one wall of the third module for electrical connection with the electrical outputs of the fuel cell and electrical power distribution circuits with fuses for the connection of electrical loads and at least one switching element for switching the electrical power distribution circuits on and off arranging the first and second modules in an apparatus, and connecting them to each other by mechanical coupling elements that include lines for the gases to be supplied to the fuel cell and gases to be dissipated from it, and coolant routing for the fuel cell, and electrical coupling elements for signal transmission between the two modules;

mounting the connected first and second modules in a common container;

inserting the container, including the first and second modules, into a corresponding cavity which is provided in an underneath side of the electric vehicle;

attaching the container to the longitudinal supports;

attaching the third module externally to a side wall of the container;

forming the electrical connections from the third module to the fuel cell and to loads in the electrical vehicle;

connecting the first module to a source for the combustion gas and to a channel for the air supply; and connecting the first module by means of inputs and outputs to at least one cooling circuit in the electrical vehicle and to output line for the reaction products from the fuel cell.

8. The method of claim 7, wherein the first module is mounted in the container by means of two screws at a front of the container, relative to a forward direction of travel of the vehicle.

9. The method of claim 8, wherein the second module is mounted by means of two screws in a rear part of the container bottom, and by one screw at each of a pair of opposing faces of the module.

10. The method of claim 9, wherein the third module is attached to a wall of the container which is adjacent to said second module and runs transversely with respect to the longitudinal supports.

\* \* \* \* \*